United States Patent [19]

Asami et al.

[11] Patent Number: 5,397,637
[45] Date of Patent: Mar. 14, 1995

[54] THERMOPLASTIC RESIN FILM WITH EXCELLENT OFFSET PRINTABILITY AND OFFSET PRINTS THEREOF

[75] Inventors: Koichi Asami; Hironobu Amagai, both of Ibaraki; Yukio Saitoh; Isao Itoh, both of Mie, all of Japan

[73] Assignee: Oji Yuka Goseishi Co., Ltd., Tokyo, Japan

[21] Appl. No.: 76,954

[22] Filed: Jun. 16, 1993

[30] Foreign Application Priority Data

Jul. 8, 1992 [JP] Japan .................................. 4-181331

[51] Int. Cl.$^6$ .............................................. B32B 5/16
[52] U.S. Cl. .................................. 428/323; 428/473.5; 428/476.3; 428/520
[58] Field of Search ................... 428/473.5, 476.3, 516, 428/523, 520

[56] References Cited

U.S. PATENT DOCUMENTS 4,906,526  3/1990  Inoue et al. ...................... 428/473.5

FOREIGN PATENT DOCUMENTS 0423829  4/1991  European Pat. Off. .

*Primary Examiner*—Edith Buffalow
*Attorney, Agent, or Firm*—Oblon, Spivak, McClelland, Maier & Neustadt

[57] ABSTRACT

A thermoplastic resin film having a coated layer thereon, the coating layer comprising a quaternary ammonium salt copolymer comprising (a) a structural unit represented by formula (I):

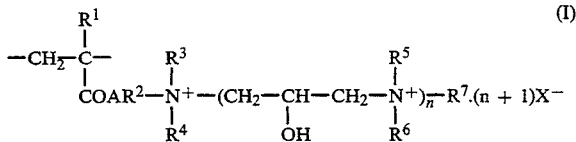

wherein A represents —O— or —NH—; $R^1$ represents a hydrogen atom or a methyl group; $R^2$ represents an alkylene group having from 2 to 4 carbon atoms or —CH$_2$CH(OH)—CH$_2$—; $R^3$, $R^4$, $R^5$, and $R^6$, which may be the same or different, each represents an alkyl group having from 1 to 3 carbon atoms; $R^7$ represents an alkyl group having from 1 to 10 carbon atoms or an aralkyl group having from 7 to 10 carbon atoms; n represents an integer of from 1 to 3; and X represents a chlorine atom, a bromine atom or an iodine atom, (b) a structural unit represented by formula (II):

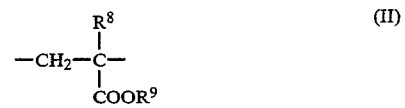

wherein $R^8$ represents a hydrogen atom or a methyl group; and $R^9$ represents an alkyl group having from 1 to 22 carbon atoms, an aralkyl group having from 7 to 22 carbon atoms or a cycloalkyl group having from 5 to 22 carbon atoms, and (c) a structural unit derived from a monomer copolymerizable with monomers providing structural units (a) and (b) at a (a):(b):(c) weight ratio of 30 to 70:30 to 70:0 to 40. The thermoplastic resin film exhibits excellent offset printability and excellent antistatic properties.

20 Claims, No Drawings

THERMOPLASTIC RESIN FILM WITH EXCELLENT OFFSET PRINTABILITY AND OFFSET PRINTS THEREOF

FIELD OF THE INVENTION

The present invention to a thermoplastic resin film having excellent antistatic properties and offset printability and to offset prints using the same.

BACKGROUND OF THE INVENTION

An opaque to semitransparent film comprising a polyolefin film containing a fine inorganic powder or a laminate having such a fine inorganic powder-containing polyolefin film on at least one side thereof, especially a film or laminate in which the fine inorganic powder-containing polyolefin film has been stretched at least uniaxially, is useful as synthetic paper.

Synthetic paper comprising the above-mentioned fine inorganic powder-containing thermoplastic resin film as a base has experienced steadily increasing use over a very board area because of its excellent physical properties such as water resistance, toughness, and surface smoothness. With its increasing utility, a synthetic paper of this type having more excellent antistatic properties and printability in offset printing or printing with ultraviolet-curing inks is in greater demand than ever.

Because polyolefins per se are non-polar and hydrophobic, polyolefin synthetic paper does not always have satisfactory antistatic properties or offset printability, and it is usually subjected to an appropriate surface treatment to improve these properties. The application of a coating agent is among such surface treatments. Known coating agents for synthetic paper include cationic antistatic agents and amphoteric antistatic agents as disclosed in JP-A-50-161478, JP-B-59-27769, and JP-B-2-2910 (corresponding to U.S. Pat. No. 4,420,530) (the terms "JP-A" and "JP-B" as used herein mean an "unexamined published Japanese patent application" and an "examined published Japanese patent application", respectively).

More specifically, JP-B-2-2910 discloses a water-soluble coating composition comprising (1) a water-soluble polymer which is obtained by preparing a tertiary nitrogen-containing polymer from a monomer represented by the formula $CH_2=CR^1-COOANR^3R^4$, a monomer represented by the formula $CH_2=CR-COOR^2$, and other hydrophobic vinyl monomers, wherein R and $R^1$ are each a hydrogen atom or a methyl group; $R^2$ is an alkyl group containing 1 to 18 carbon atoms; $R^3$ and $R^4$ are each a hydrogen atom or an alkyl group containing 1 or 2 carbon atoms; and A is an alkylene group containing 2 to 6 carbon atoms and quaternizing the tertiary nitrogen atom of the resulting polymer with a cationizing agent to make the polymer amphoteric, (2) a water-soluble polyaminepolyamide-epichlorohydrin adduct, and (3) a polyethyleneimine compound.

JP-A-53-8380 discloses a conducting agent having an antistatic effect which comprises a polymer comprising a repeating unit represented by the formula:

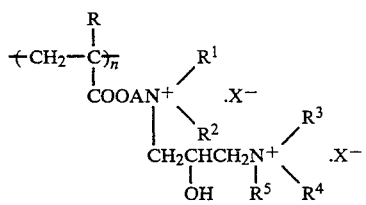

wherein R represents a hydrogen atom or a methyl group; $R^1$ and $R^2$ each represent a methyl group or an ethyl group; $R^3$ and $R^4$ each represent a methyl group, an ethyl group, $-(CH_2CH_2O)_m H$, wherein m is an integer of 1 to 4, or a benzyl group; $R^5$ represents an alkyl group having 1 to 18 carbon atoms, an alkenyl group or $-(CH_2CH_2O)_p H$, wherein p is an integer of 1 to 4; $X^-$ represents a halide ion; A represents a substituted or unsubstituted alkylene group; and n represents an integer usually ranging from $10^1$ to $10^4$.

Application of these antistatic agents makes the synthetic paper printable by general antistatic offset printing, but the antistatic agents are still insufficient as an antistatic treatment for assuring printability during printing at very high speeds or under severe conditions. In other words, an increase in ion quantity, in an attempt to improve antistatic properties, would make the antistatic agent excessively hydrophilic, making offset printing infeasible. The limit of the ion quantity with weight attached to offset printability has thus been a bar to further improvement in antistatic properties. Therefore, none of the coating agents proposed to date exhibit both satisfactory antistatic properties and printability. On the other hand, where offset printing is performed at high speeds using ultraviolet-curing offset printing inks instead of the conventional solvent evaporation type offset printing inks, printed sheets are forwarded while wet which causes an image defect called white spots.

SUMMARY OF THE INVENTION

Accordingly, one object of the present invention is to provide synthetic paper with improved antistatic properties and printability during offset printing or printing with ultraviolet-curing inks.

Briefly, this object and other objects of the invention as hereinafter will become more readily apparent can be attained by a thermoplastic resin film having satisfactory printability which has a coated layer comprising a quaternary ammonium salt copolymer comprising (a) a structural unit represented by formula (I):

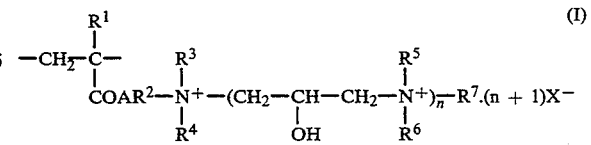

wherein A represents $-O-$ or $-NH-$; $R^1$ represents a hydrogen atom or a methyl group; $R^2$ represents an alkylene group having from 2 to 4 carbon atoms or $-CH_2CH(OH)-CH_2-$; $R^3$, $R^4$, $R^5$, and $R^6$, which may be the same or different, each represents an alkyl group having from 1 to 3 carbon atoms; $R^7$ represents an alkyl group having from 1 to 10 carbon atoms or an aralkyl group having from 7 to 10 carbon atoms; n represents an integer of from 1 to 3; and X represents a chlorine atom, a bromine atom or an iodine atom, (b) a structural unit represented by formula (II):

wherein $R^8$ represents a hydrogen atom or a methyl group; and $R^9$ represents an alkyl group having from 1 to 22 carbon atoms, an aralkyl group having from 7 to 22 carbon atoms or a cycloalkyl group having from 5 to 22 carbon atoms, and (c) a structural unit derived from a monomer copolymerizable with monomers providing structural units (a) and (b) at a (a):(b):(c) weight ratio of 30 to 70:30 to 70:0 to 40.

DETAILED DESCRIPTION OF THE INVENTION

As a result of extensive investigations it has been found that synthetic paper, particularly a polyolefin synthetic paper, can be prepared which is endowed with excellent antistatic properties, even under low humidity conditions, and with excellent offset printability by forming a coated layer containing a specific quaternary ammonium salt copolymer on the surface of the paper.

The thermoplastic resin film having satisfactory printability according to the present invention comprises a base layer comprising a thermoplastic resin film, particularly a polyolefin synthetic paper layer comprising a stretched polyolefin film containing a fine inorganic powder, and a coated layer containing a quaternary ammonium salt copolymer which has been coated on the base layer and dried.

The thermoplastic resin film as a base layer includes films or sheets provided with at least one surface of a film of a thermoplastic resin such as a polyolefin, e.g., polypropylene, polyethylene, or a propylene-ethylene copolymer, polyethylene terephthalate, polybutylene terephthalate, polystyrene, nylon-6, or the like, which may contain a fine inorganic powder or an organic filler.

Suitable thermoplastic resin films, especially synthetic paper per se are well known. For details, reference can be made to JP-B-49-1782, JP-A-56-118437, JP-A-57-12642, JP-A-57-56224, and U.S. Pat. No. 4,341,880.

Specific examples of the thermoplastic resin films include a laminated film comprising a biaxially stretched thermoplastic resin film containing 5 to 40% by weight of a fine inorganic powder, as a base layer, and a uniaxially stretched polyolefin film containing 8 to 65% by weight of a fine inorganic powder, e.g., calcined clay, diatomaceous earth, titanium oxide, vermiculite, calcium carbonate or talc, having a particle size of, e.g., from 0.05 to 10 μm as a surface layer, the surface layer having fine cracks around the fine inorganic particles on the surface thereof and a number of microvoids (at least 5 voids per mm²) in the inside thereof (see JP-B-46-40794 or U.S. Pat. No. 4,318,950); and multi-layer synthetic paper comprising the above-mentioned laminated film having further laminated on the surface thereof a polyolefin film layer containing substantially no fine inorganic powder and having a thickness of from 0.5 to 3 μm or synthetic paper with a pearly luster comprising a biaxially stretched thermoplastic resin film containing from 10 to 40% by weight of a fine inorganic powder (see JP-A-61-3748 or JP-B-1-6041).

Before being coated with a coating agent of the present invention, the thermoplastic resin film may be subjected to another surface treatment such as a corona discharge treatment.

The quaternary ammonium salt copolymer (hereinafter referred to as component A), which is coated as a layer on the thermoplastic resin film and which is a component of the coating agent comprises (a) a quaternary ammonium salt monomer unit represented by formula (I), (b) a hydrophobic monomer unit represented by formula (II), and (c) a structural unit derived from another copolymerizable monomer at a (a):(b):(c) weight ratio of 30 to 70:30 to 70:0 to 40.

Monomer unit (a) can be derived from a monomer obtained by modifying a quaternary amine-containing compound represented by formula (IV):

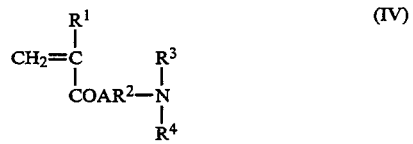

wherein A, $R^1$, $R^2$, $R^3$, and $R^4$ are the same as those as defined in formula (I) above, such as dimethylaminoethyl (meth)acrylate, diethylaminoethyl (meth)acrylate, and dimethylaminopropyl (meth)acrylamide (hereinafter, both the acrylate and methacrylate are generally referred to as "(meth)acrylate", and both the acrylamide and methacrylamide are generally referred to as "(meth)acrylamide"), with a modifying agent represented by formula (V):

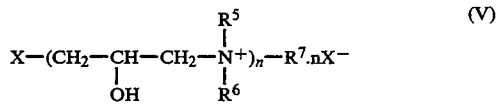

wherein $R^5$, $R^6$, $R^7$, n, and X are the same as those as defined in formula (I) above, such as 3-chloro-2-hydroxypropyltrimethylammonium chloride.

The modification of a monomer unit derived from the above-mentioned quaternary amine-containing monomer of formula (IV) with the modifying agent of formula (V) may be performed after copolymerization.

Monomers providing hydrophobic monomer unit (b) of formula (II) include alkyl (meth)acrylates such as methyl (meth)acrylate, ethyl (meth)acrylate, butyl (meth)acrylate, isobutyl (meth)acrylate, t-butyl (meth)acrylate, cyclohexyl (meth)acrylate, 2-ethylhexyl (meth)acrylate, lauryl (meth)acrylate, tridecyl (meth)acrylate, and stearyl (meth)acrylate. Preferred monomer unit (b) is a unit derived from a combination of methyl or ethyl methacrylate ($R^9=C_{1-2}$ alkyl) and an alkyl methacrylate ($R^9=C_{4-22}$ alkyl) or cyclohexyl methacrylate.

Copolymerizable monomers providing monomer unit (c), which may be used if desired, include hydrophobic monomers such as styrene, vinyltoluene and vinyl acetate, and hydrophilic monomers such as vinylpyrrolidone, (meth)acrylamide, 2-hydroxyethyl methacrylate, and 2-hydroxypropyl methacrylate. Specific examples of monomer unit (c) are shown below.

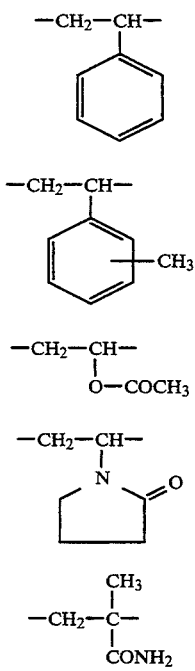

Component (A) has a (a):(b):(c) weight ratio of 30 to 70:30 to 70:0 to 40, preferably 35 to 65:35 to 65:0 to 20, and more preferably 40 to 60:40 to 60:0 to 10.

Unit (a) contributes to antistatic properties. If its proportion is less than 30% by weight, a sufficient antistatic effect cannot be provided. If it exceeds 70% by weight, component (A) is excessively water-soluble, with the resultant deterioration in printability during continuous offset printing, particularly causing poor transfer of a second color ink during multicolor printing.

Unit (b) contributes to the prevention of ink blotting and improvement in ink transfer. If its proportion is less than 30% by weight, these effects are reduced. If it exceeds 70% by weight, the antistatic properties are relatively reduced.

The polymerization of monomers for obtaining component (A) is conducted in the presence of a radical initiator by bulk polymerization, solution polymerization, emulsion polymerization, or the like. Of these polymerization techniques, preferred is solution polymerization in which monomers are dissolved in a solvent and heated with stirring in a nitrogen stream in the presence of a radical polymerization initiator. Suitable solvents include water and alcohols such as methyl alcohol, ethyl alcohol, and isopropyl alcohol, and mixtures thereof. Suitable polymerization initiators include peroxides, e.g., benzoyl peroxide and lauroyl peroxide, and azo compounds, e.g., azobisisobutyronitrile and azobisvaleronitrile. The total monomer concentration in the solution is usually from 10 to 60% by weight, and the initiator is usually used in a concentration of from 0.1 to 10% by weight based on the total monomers.

The quaternary ammonium salt copolymer (A) may have any desired level of molecular weight by controlling the polymerization temperature, the kind and amount of the initiator, the amount of the solvent and chain transfer agent, and the like. A preferred molecular weight of component (A) is usually from 1,000 to 1,000,000, and particularly from 1,000 to 500,000.

A coating layer solely comprising component (A) is sufficient for achieving the object of satisfying offset printability. If desired, particularly when using ultraviolet-curing inks, the coated layer may contain (B) a polyethyleneimine copolymer for improving ink adhesion, particularly of ultraviolet-curing inks.

Polyethyleneimine polymers, as component (B), include polyethyleneimine and a modified polyethyleneimine, e.g., a polyaminepolyamide-polyethyleneimine adduct and an alkylated ($C_{1-8}$) polyethyleneimine (see JP-A-1-141736). From the standpoint of offset ink adhesion and ink transfer, preferred are polyethyleneimine and a modified polyethyleneimine obtained by modifying a polyaminepolyamidepolyethyleneimine adduct with an alkyl halide having from 1 to 24 carbon atoms, an alkenyl halide having from 2 to 24 carbon atoms, a cycloalkyl halide having from 5 to 24 carbon atoms or a benzyl halide.

The degree of polymerization of the polyethyleneimine to be used is not limited, but preferably ranges from 20 to 300.

If desired, the coating agent of the present invention may further contain (C) an epichlorohydrin-modified polyaminepolyamide which contributes to improvement in water-resistant ink adhesion. The polyaminepolyamide-epichlorohydrin adduct, as component (C), is a watersoluble cationic thermosetting resin obtained by reacting a polyamide prepared from a saturated dibasic carboxylic acid containing from 3 to 10 carbon atoms and a polyalkylenepolyamine with epichlorohydrin. For the details of the thermosetting resin, reference is made to JP-B-35-3547.

The coating agent of the present invention may furthermore contain (D) a water-soluble inorganic salt. Component (D) serves to improve antistatic properties and to increase the rate of drying of offset inks. It should be noted, however, that the presence of a water-soluble inorganic salt in excess tends to reduce water-resistant ink adhesion. Examples of suitable water-soluble inorganic salts include alkaline salts such as sodium carbonate, sodium hydrogencarbonate, potassium carbonate, and sodium sulfite, and neutral salts such as sodium chloride, sodium sulfate, and sodium nitrate.

In addition to the essential component (A) and optional components (B) to (D), the coating agent of the present invention may also contain surface active agents, water-soluble or water-dispersible polymers, finely divided substances, and other auxiliary materials.

Each of the above-mentioned components (A) to (D) may be used either individually or in combination of two or more. Preferred proportions of optional components (B) to (D) per 100 parts by weight of the essential component (A) are from 5 to 300 parts by weight, and preferably from 20 to 100 parts by weight, for component (B), from 0 to 300 parts by weight, and preferably from 20 to 100 parts by weight for component (C), and from 0 to 50 parts by weight, and preferably from 5 to 20 parts by weight, for component (D).

The above-mentioned components are used as dissolved in water or a hydrophilic solvent such as methyl alcohol, ethyl alcohol, or isopropyl alcohol, and usually in the form of an aqueous solution. The solution usually has a concentration ranging from about 0.5 to 3% by weight, and preferably from about 1 to 2% by weight.

The coating solution is coated on the thermoplastic resin film by means of a roll coater, a blade coater, an air knife coater, a size press coater, etc., and dried to form a coated film. The coating solution is coated in an amount usually of from 0.01 to 8 g/m², and preferably from 0.05 to 3 g/m², on a solid basis.

Offset printing inks which may be used for printing of the coated thermoplastic resin film according to the present invention include oxidative polymerization type oil offset inks, e.g., "POP-KC" (produced by Dainippon Ink & Chemicals, Inc.), "TSP-400" (produced by Toyo Ink Manufacturing Co., Ltd.), "SSP-707 NS" (produced by Sakata Inx Corporation), and "Best-SP" (produced by T & K TOKA CO., LTD.); and ultraviolet-curing offset inks, e.g., "New Daicure OL[ (produced by Dainippon Ink & Chemicals, Inc.), "FDO-G" (produced by Toyo Ink Manufacturing Co., Ltd.), and "Bestcure 161", "Bestcure STP(H)" (produced by T & K TOKA CO., LTD.).

Having generally described this invention, a further understanding can be obtained by reference to certain specific examples which are provided herein for purposes of illustration only and are not intended to be limiting unless otherwise specified. All the percents and parts are given by weight unless otherwise noted.

[I] Preparation of Base Layer

Preparation of Synthetic Paper-1

(1) Composition (C') comprising 88% of polypropylene having a melt flow rate (MFR) of 0.8 g/10 min and a melting point of 164° C. and 12% of calcium carbonate having an average particle size of 1.5 μm was kneaded in an extruder set at 270° C., extruded into a sheet, and cooled in a cooling apparatus to obtain an unstretched sheet.

The sheet was heated to 140° C. and stretched 5 times in the machine direction.

(2) Composition (A') comprising 49% of polypropylene having an MFR of 4.0 g/10 min, 5% of maleic acid-modified polypropylene having a maleic acid content of 0.5%, and 46% of calcium carbonate having an average particle size of 1.5 μm (modifying maleic acid monomer content: 0.05 part per 100 parts of the filler) was melt-kneaded in an extruder set at 270° C. Separately, composition (B') comprising 55% of polypropylene having an MFR of 4.0 g/10 min and 45% of calcium carbonate having an average particle size of 1.5 μm was melt-kneaded in a separate extruder set at 270° C. Molten compositions (A') and (B') were laminated in a die and co-extruded on both sides of the 5-fold stretched sheet obtained in (1) above with composition (A') as an outer layer to obtain a 5-layered laminated sheet having a structure of A'/B'/C'/B'/A'.

The laminated sheet was heated to 155° C. and stretched 5 times in the transverse direction to prepare synthetic paper-1 having a total thickness of 100 μm (A'/B'/C'/B'/A'=5/20/50/20/5 μm).

Preparation of Synthetic Paper-2

Synthetic paper-2 was prepared in the same manner as synthetic paper-1, except for using polypropylene (MFR: 4.0 g/10 min) alone in place of composition (A').

Preparation of Synthetic Paper-3

Synthetic paper-3 was prepared in the same manner as synthetic paper-1, except for using a mixture of 50% of polypropylene having an MFR of 10 g/10 min and 50% of high-density polyethylene having an MFR of 20 g/10 min in place of composition (A').

[II] Preparation of Quaternary Ammonium Salt Copolymer (Component A):

Preparation of Copolymer A-1

In a four-necked flask equipped with a reflux condenser, a thermometer, a glass tube for nitrogen displacement, and a stirrer were charged 35 parts of dimethylaminoethyl methacrylate, 20 parts of ethyl methacrylate, 20 parts of cyclohexyl methacrylate, 25 parts of stearyl methacrylate, 150 parts of ethyl alcohol, and 1 part of azobisisobutyronitrile, and polymerization was conducted at 80° C. in a nitrogen stream for 6 hours.

To the reaction system was added 70 parts of a 60% aqueous solution of 3-chloro-2-hydroxypropyltrimethylammonium chloride, and the mixture was allowed to react at 80° C. for 15 hours. Ethyl alcohol was removed by distillation while dropwise adding water to obtain copolymer A-1 having a final solids content of 20%.

Preparation of Copolymer A-2

In the same manner as for copolymer A-1, a mixture of 30 parts of dimethylaminopropyl methacrylate, 30 parts of methyl methacrylate, 40 parts of butyl methacrylate, 150 parts of ethyl alcohol, and 1 part of azobisisobutyronitrile was subjected to polymerization at 80° C. in a nitrogen stream for 6 hours.

To the reaction system was added 55 parts of a 60% aqueous solution of 3-chloro-2-hydroxypropyltrimethylammonium chloride. Reaction was conducted at 80° C. for 15 hours. Ethyl alcohol was removed by distillation while dropwise adding water to obtain copolymer A-2 having a final solids content of 20%.

Preparation of Copolymer A-3

In the same manner as for copolymer A-1, a mixture of 35 parts of dimethylaminoethyl methacrylate, 30 parts of methyl methacrylate, 40 parts of ethyl methacrylate, 150 parts of ethyl alcohol, and 1 part of azobisisobutyronitrile was subjected to polymerization at 80° C. in a nitrogen stream for 6 hours.

To the reaction system was added 147 parts of a 40% aqueous solution of 3-chloro-2-hydroxypropyldimethylbenzylammonium chloride. Reaction was conducted at 80° C. for 15 hours. Ethyl alcohol was removed by distillation while dropwise adding water to obtain copolymer A-3 having a final solids content of 20%.

Preparation of Copolymer A-4

In the same manner as for copolymer A-1, a mixture of 50 parts of a 80% aqueous solution of methacryloxyethyltrimethylammonium chloride, 30 parts of methyl methacrylate, 30 parts of ethyl methacrylate, 150 parts of ethyl alcohol, and 1 part of azobisisobutyronitrile was subjected to polymerization at 80° C. in a nitrogen stream for 6 hours.

Ethyl alcohol was removed by distillation while dropwise adding water to obtain copolymer A-4 having a final solids content of 20%.

Polyethyleneimine Polymer (Component B)

B-1: "Polymin SN" (a polyethyleneimine adduct of polyamideamine, produced by BASF, A.G.)

B-2: Butyl chloride-modified polyethyleneimine

Polyaminepolyamide-Epichlorohydrin Adduct (Component C)

C-1: "Arafix 100" (produced by Arakawa Chemical Industries, Ltd.)
C-2: "Kymen 557H" (produced by Dick Hercules Inc.)

Inorganic Salt (Component D)

D-1: Sodium carbonate
D-2: Potassium chloride

[III] Evaluation:

The coated synthetic papers prepared were evaluated in terms of surface resistivity (antistatic properties), offset printability, ink transfer, and ink adhesion in accordance with the following test methods.

1) Surface Resistivity

Surface resistivity of synthetic paper was measured with a surface resistivity meter "HIRESTA MODEL HT-250" (manufactured by Mitsubishi Petrochemical Co., Ltd.) under conditions of 23° C. and 30% or 60% RH (relative humidity).

2) Offset Printability

Synthetic paper was continuously printed by using an offset printing machine "Dia 1F-2" (manufactured by Mitsubishi Heavy Industries, Ltd.) and an offset printing ink "No. 2 for Synthetic Paper" (produced by T & K TOKA CO., LTD.), and the behavior in paper feeding and ink transfer were rated according to the following standard.

2-1: Paper Feeding:
5 ... No problem.
4 ... Practically no problem.
3 ... Feeding of two sheets at a time (double sheeting) occurs infrequently, causing no problem on practical use.
2 ... Double sheeting occurs, causing problems on practical use.
1 ... Double sheeting occurs frequently, making continuous printing difficult.

2-2 Ink Transfer:
5 ... No problem.
4 ... Satisfactory regardless of the amount of damping water applied.
3 ... Slightly poor depending on the amount of damping water applied, causing no problem on practical use.
2 ... Poor depending on the amount of damping water applied, causing problems on practical use.
1 ... Poor regardless of the amount of damping water applied.

3) Ink Transfer:

Synthetic paper was printed by means of "RI Tester" (manufactured by Akira Seisakusho) using an ultraviolet-curing ink "Bestcure 161" (produced by T & K TOKA CO., LTD.) at a color pickup of about 1.5 g/m². Whatever unfavorable conditions on the printed ink surface, such as coating streaks and white spots due to poor ink transfer were observed with the naked eye and rated as follows.
5 ... Very good.
4 ... Good.
3 ... No problem for practical use, though the transferred ink color is thin.
2 ... The transferred ink color is thin, and streaks are observed.
1 ... Scarcely any transfer of ink.

4) Ink Adhesion:

Synthetic paper was printed in the same manner as in 3) above, except at a color pick of about 3 g/m². The print was passed under a high-pressure mercury lamp (80 W/cm) placed 10 cm above 10 times each at a speed of 25 mm/min for UV curing. A piece of adhesive tape was intimately applied onto the ink surface and then quickly peeled off. The results of the peel test were rated as follows.
5 ... The ink layer did not peel off at all.
4 ... A small portion of the ink layer peeled off.
3 ... The peeled area of the ink layer was not more than 25%.
2 ... The peeled area of the ink layer was between 25 and 50%.
1 ... The peeled area of the ink layer was 50% or more.

EXAMPLE 1

The following components were mixed, diluted with water in order to formulate compositions shown below in terms of part of component per 100 parts of the total weight, and thoroughly stirred to prepare a coating composition.

| A-1 | 0.5 part |
| B-1 | 0.5 part |
| C-1 | 0.4 part |
| D-1 | 0.1 part |

Both sides of synthetic paper-1 were subjected to a corona discharge treatment and then coated with the above-prepared coating composition with a roll at a solid spread of 0.05 g/m² per side. The coated film was dried at 65° C. and rolled up.

The physical properties of the resulting coated synthetic paper, i.e., surface resistivity, offset printability, ink transfer, and ink adhesion, were evaluated according to the above-mentioned test methods. The results obtained are shown in Table 1 below.

EXAMPLES 2 TO 7 AND COMPARATIVE EXAMPLES 1 TO 5

Coated synthetic paper was obtained in the same manner as in Example 1, except for using the synthetic paper (base layer) and coating composition shown in Tables 1 and 2. The resulting coated synthetic paper was evaluated in the same manner as described in Example 1. The results obtained are shown in Tables 1 and 2.

TABLE 1

| | Example 1 | Example 2 | Example 3 | Example 4 | Example 5 | Example 6 | Example 7 |
| --- | --- | --- | --- | --- | --- | --- | --- |
| Synthetic Paper (Base Layer) | 1 | 1 | 1 | 1 | 1 | 2 | 3 |
| Coating Composition (part): | | | | | | | |
| Component (A) | A-1 (0.5) | A-2 (0.7) | A-3 (1.0) | A-1 (1.5) | A-1 (1.0) | A-1 (0.5) | A-1 (0.5) |

TABLE 1-continued

|  | Example 1 | Example 2 | Example 3 | Example 4 | Example 5 | Example 6 | Example 7 |
|---|---|---|---|---|---|---|---|
| Component (B) | B-1 (0.5) | B-2 (0.4) | B-2 (0.3) | — | B-2 (0.5) | B-1 (0.5) | B-2 (0.5) |
| Component (C) | C-1 (0.4) | C-2 (0.3) | C-2 (0.2) | — | — | C-1 (0.4) | C-2 (0.4) |
| Component (D) | D-1 (0.1) | D-2 (0.1) | D-1 (0.1) | — | — | D-1 (0.1) | D-1 (0.1) |
| Surface Resistivity ($\Omega/\square$): | | | | | | | |
| 60% RH | $4.3 \times 10^{10}$ | $5.5 \times 10^{10}$ | $8.2 \times 10^{9}$ | $3.6 \times 10^{9}$ | $3.0 \times 10^{9}$ | $3.5 \times 10^{10}$ | $5.0 \times 10^{10}$ |
| 30% RH | $4.1 \times 10^{12}$ | $8.4 \times 10^{12}$ | $1.3 \times 10^{11}$ | $5.3 \times 10^{11}$ | $4.2 \times 10^{11}$ | $2.6 \times 10^{12}$ | $2.9 \times 10^{12}$ |
| Offset Printability: | | | | | | | |
| Paper Feeding | 4 | 4 | 5 | 5 | 5 | 4 | 4 |
| Ink Transfer | 5 | 5 | 5 | 5 | 5 | 5 | 5 |
| Offset Printability with UV-curing Ink: | | | | | | | |
| Paper Feeding | 4 | 4 | 5 | 5 | 5 | 4 | 4 |
| Ink Transfer | 5 | 5 | 5 | 4 | 4 | 5 | 5 |
| Ink Adhesion | 5 | 4 | 3 | 1 | 4 | 5 | 5 |

TABLE 2

|  | Comparative Example 1 | Comparative Example 2 | Comparative Example 3 | Comparative Example 4 | Comparative Example 5 |
|---|---|---|---|---|---|
| Synthetic Paper (Base Layer) | 1 | 1 | 2 | 3 | 1 |
| Coating Composition (part): | | | | | |
| Component (A) | A-4 (0.5) | A-4 (1.0) | A-4 (0.5) | A-4 (0.5) | — |
| Component (B) | B-1 (0.5) | B-2 (0.3) | B-1 (0.5) | B-2 (0.5) | B-1 (0.7) |
| Component (C) | C-1 (0.5) | C-2 (0.2) | C-1 (0.4) | C-2 (0.4) | C-1 (0.5) |
| Component (D) | D-1 (0.1) | D-1 (0.1) | D-1 (0.1) | D-1 (0.1) | D-1 (0.2) |
| Surface Resistivity ($\Omega/\square$): | | | | | |
| 60% RH | $4.5 \times 10^{11}$ | $1.3 \times 10^{10}$ | $2.4 \times 10^{11}$ | $1.9 \times 10^{11}$ | $7.3 \times 10^{12}$ |
| 30% RH | $>10^{14}$ | $7.1 \times 10^{12}$ | $>10^{14}$ | $>10^{14}$ | $>10^{14}$ |
| Offset Printability: | | | | | |
| Paper Feeding | 2 | 4 | 2 | 2 | 1 |
| Ink Transfer | 3 | 3 | 3 | 3 | 1 |
| Offset Printability with UV-curing Ink: | | | | | |
| Paper Feeding | 1 | 3 | 2 | 2 | 1 |
| Ink Transfer | 3 | 3 | 2 | 4 | 2 |
| Ink Adhesion | 4 | 3 | 4 | 5 | 5 |

As is apparent from the results in Table 1, the coated synthetic paper according to the present invention exhibits excellent antistatic properties and printability. To the contrary, the comparative coated synthetic paper whose coating layer contained no quaternary ammonium salt copolymer has insufficient antistatic properties and poor offset printability as shown in Table 2.

As described and demonstrated above, the coated thermoplastic resin film according to the present invention retains excellent antistatic properties even under low humidity conditions, while exhibiting excellent offset printability and thus satisfies the increasing practical requirements for such films.

While the invention has been described in detail and with reference to specific examples thereof, it will be apparent to one skilled in the art that various changes and modifications can be made therein without departing from the spirit and scope thereof.

What is claimed is:

1. A thermoplastic resin film with satisfactory printability having a coated layer comprising a quaternary ammonium salt copolymer comprising (a) a structural unit represented by formula (I):

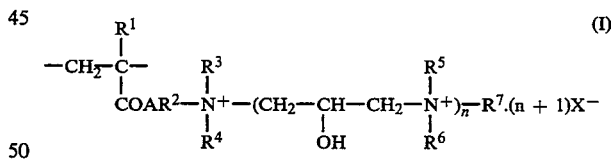

wherein A represents —O— or —NH—; $R^1$ represents a hydrogen atom or a methyl group; $R^2$ represents an alkylene group having from 2 to 4 carbon atoms or —CH$_2$CH(OH)—CH$_2$—; $R^3$, $R^4$, $R^5$, and $R^6$, which may be the same or different, each represents an alkyl group having from 1 to 3 carbon atoms; $R^7$ represents an alkyl group having from 1 to 10 carbon atoms or an aralkyl group having from 7 to 10 carbon atoms; n represents an integer of from 1 to 3; and X represents a chlorine atom, a bromine atom or an iodine atom, (b) a structural unit represented by formula (II):

wherein R⁸ represents a hydrogen atom or a methyl group; and R⁹ represents an alkyl group having from 1 to 22 carbon atoms, an aralkyl group having from 7 to 22 carbon atoms or a cycloalkyl group having from 5 to 22 carbon atoms, and (c) a structural unit derived from a monomer copolymerizable with monomers providing structural units (a) and (b) at a (a):(b):(c) weight ratio of 30 to 70:30 to 70:0 to 40.

2. The thermoplastic resin film as claimed in claim 1, wherein a thermoplastic resin film to be coated with the coated layer is synthetic paper comprising a stretched polyolefin film containing a fine inorganic powder.

3. The thermoplastic resin film as claimed in claim 2, wherein said fine inorganic powder is selected from the group consisting of calcined clay, diatomaceous earth, titanium oxide, vermiculite, calcium carbonate and talc each having a particle size of from 0.05 to 10 μm.

4. The thermoplastic resin film as claimed in claim 1, wherein a coating composition for said coated layer has a solids content of from 0.01 to 8 g/m².

5. The thermoplastic resin film as claimed in claim 1, wherein said structural unit (b) is a combination between a unit derived from a lower alkyl methacrylate monomer selected from the group consisting of methyl methacrylate and ethyl methacrylate and a unit derived from a monomer selected from the group consisting of an alkyl methacrylate having from 4 to 22 carbon atoms in the alkyl moiety thereof and cyclohexyl methacrylate.

6. The thermoplastic resin film as claimed in claim 1, wherein said quaternary ammonium salt copolymer is a salt obtained by modifying a dimethylaminoethyl methacrylate-ethyl methacrylate-cyclohexyl methacrylate-stearyl methacrylate copolymer with 3-chloro-2-hydroxypropyltrimethylammonium chloride.

7. The thermoplastic resin film as claimed in claim 1, wherein said quaternary ammonium salt copolymer is a salt obtained by modifying a dimethylaminopropyl methacrylamide-methyl methacrylate-butyl methacrylate with 3-chloro-2-hydroxypropyltrimethylammonium chloride.

8. The thermoplastic resin film as claimed in claim 1, wherein said quaternary ammonium salt copolymer is a salt obtained by modifying a dimethylaminoethyl methacrylate-methyl methacrylate-ethyl methacrylate copolymer with 3-chloro-2-hydroxypropyldimethylbenzylammonium chloride.

9. The thermoplastic resin film as claimed in claim 1, wherein said coated layer further contains polyethyleneimine or a modified polyethyleneimine.

10. The thermoplastic resin film as claimed in claim 1, wherein said coated layer comprises (A) 100 parts by weight of said quaternary ammonium salt copolymer, (B) from 20 to 100 parts by weight of polyethyleneimine, (C) from 20 to 100 parts by weight of a polyaminepolyamide-epichlorohydrin adduct, and (D) from 5 to 20 parts by weight of a water-soluble inorganic salt.

11. An offset print comprising synthetic paper comprising a stretched polyolefin film containing a fine inorganic powder having formed thereon a coated layer comprising a quaternary ammonium salt copolymer comprising (a) a structural unit represented by formula (I):

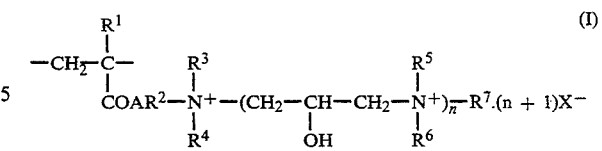

wherein A represents —O— or —NH—; R¹ represents a hydrogen atom or a methyl group; R² represents an alkylene group having from 2 to 4 carbon atoms or —CH₂CH(OH)—CH₂—; R³, R⁴, R⁵, and R⁶, which may be the same or different, each represents an alkyl group having from 1 to 3 carbon atoms; R⁷ represents an alkyl group having from 1 to 10 carbon atoms or an aralkyl group having from 7 to 10 carbon atoms; n represents an integer of from 1 to 3; and X represents a chlorine atom, a bromine atom or an iodine atom, (b) a structural unit represented by formula (II):

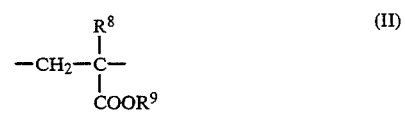

wherein R⁸ represents a hydrogen atom or a methyl group; and R⁹ represents an alkyl group having from 1 to 22 carbon atoms, an aralkyl group having from 7 to 22 carbon atoms or a cycloalkyl group having from 5 to 22 carbon atoms, and (c) a structural unit derived from a monomer copolymerizable with monomers providing structural units (a) and (b) at a (a):(b):(c) weight ratio of 30 to 70:30 to 70:0 to 40, said coating layer having been offset printed.

12. The offset print as claimed in claim 11, wherein said fine inorganic powder is selected from the group consisting of calcined clay, diatomaceous earth, titanium oxide, vermiculite, calcium carbonate and talc each having a particle size of from 0.05 to 10 μm.

13. The offset print as claimed in claim 11, wherein a coating composition for said coated layer has a solids content of from 0.01 to 8 g/m².

14. The offset print as claimed in claim 11, wherein said coated layer has been offset printed with an ultraviolet-curing offset ink.

15. The offset print as claimed in claim 11, wherein said structural unit (b) is a combination between a unit derived from a lower alkyl methacrylate monomer selected from the group consisting of methyl methacrylate and ethyl methacrylate and a unit derived from a monomer selected from the group consisting of an alkyl methacrylate having from 4 to 22 carbon atoms in the alkyl moiety thereof and cyclohexyl methacrylate.

16. The offset print as claimed in claim 15, wherein said quaternary ammonium salt copolymer is a salt obtained by modifying a dimethylaminoethyl methacrylate-ethyl methacrylate-cyclohexyl methacrylate-stearyl methacrylate copolymer with 3-chloro-2-hydroxypropyltrimethylammonium chloride.

17. The offset print as claimed in claim 15, wherein said quaternary ammonium salt copolymer is a salt obtained by modifying a dimethylaminopropyl methacrylamide-methyl methacrylate-butyl methacrylate with 3-chloro-2-hydroxypropyltrimethylammonium chloride.

18. The offset print as claimed in claim 11, wherein said quaternary ammonium salt copolymer is a salt obtained by modifying a dimethylaminoethyl methacrylate-methyl methacrylate-ethyl methacrylate copolymer with 3-chloro-2-hydroxypropyldimethylbenzylammonium chloride.

19. The offset print as claimed in claim 11, wherein said coated layer further contains polyethyleneimine or a modified polyethyleneimine.

20. The offset print as claimed in claim 11, wherein said coated layer comprises (A) 100 parts by weight of said quaternary ammonium salt copolymer, (B) from 20 to 100 parts by weight of polyethyleneimine, (C) from 20 to 100 parts by weight of a polyaminepolyamide-epichlorohydrin adduct, and (D) from 5 to 20 parts by weight of a water-soluble inorganic salt.

* * * * *